United States Patent
Bobak et al.

(10) Patent No.: US 6,389,482 B1
(45) Date of Patent: *May 14, 2002

(54) DYNAMIC TRANSITIONING FROM A LOCAL PIPE TO A CROSS-SYSTEM PIPE

(75) Inventors: Roman Anthony Bobak, Wappingers Falls; Scott Brady Compton, Hyde Park; Jon Kim Johnson, Pleasant Valley; David Lee Meck, Hyde Park; William Robert Richardson, Fishkill, all of NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/919,903

(22) Filed: Aug. 28, 1997

(51) Int. Cl.$^7$ ............................................. G06F 15/16
(52) U.S. Cl. ...................... 709/312; 709/329; 711/169
(58) Field of Search ................................ 709/300, 303, 709/302, 310–332; 710/124; 712/1; 711/169

(56) References Cited

U.S. PATENT DOCUMENTS

| | | | |
|---|---|---|---|
| 5,060,148 A | 10/1991 | Isobe et al. ................. 364/200 |
| 5,241,675 A | 8/1993 | Sheth et al. ................. 395/600 |
| 5,280,611 A | 1/1994 | Mohan et al. ............... 395/600 |
| 5,305,448 A | 4/1994 | Insalaco et al. ............. 395/425 |
| 5,317,739 A | 5/1994 | Elko et al. .................. 395/650 |
| 5,325,492 A | * 6/1994 | Bonvento et al. ........... 710/129 |
| 5,339,427 A | 8/1994 | Elko et al. .................. 395/725 |
| 5,410,695 A | 4/1995 | Frey et al. .................. 395/650 |
| 5,515,499 A | 5/1996 | Allen et al. ............. 395/182.03 |
| 5,561,809 A | 10/1996 | Elko et al. .................. 395/800 |
| 5,574,898 A | 11/1996 | Leblang et al. ............. 395/601 |
| 5,787,300 A | * 7/1998 | Wijaya ......................... 712/1 |
| 6,047,323 A | * 4/2000 | Krause ....................... 709/227 |
| 6,061,771 A | * 5/2000 | Bobak et al. ............... 711/169 |
| 6,092,166 A | * 7/2000 | Bobak et al. ............... 711/169 |
| 6,170,045 B1 | * 1/2001 | Bobak et al. ............... 711/169 |

* cited by examiner

Primary Examiner—St. John Courtenay, III
(74) Attorney, Agent, or Firm—William A. Kinnaman, Jr., Esq.; Lawrence D. Cutter, Esq.; Heslin Rothenberg Farley & Mesiti P.C.

(57) ABSTRACT

When applications connect to a data pipe, which is located on the same system as the connecting applications, the data pipe is considered a local pipe. That is, local media is used to pipe the data. If, however, an application on a different system is to access the pipe, the pipe is transitioned from a local pipe to a cross-system pipe, in which an alternative non-local media is used to pipe the data. The application causing the transition and any other applications to subsequently connect to the pipe use the cross-system pipe. Any local applications still allocated to the pipe are transitioned, such that they now access the cross-system pipe, instead of the local pipe. Likewise, when an application disconnects from a cross-system pipe, such that all remaining connections to the pipe are local connections, the pipe is transitioned from a cross-system pipe to a local pipe.

38 Claims, 5 Drawing Sheets

DYNAMIC TRANSITIONING FROM A LOCAL PIPE TO A CROSS-SYSTEM PIPE

TECHNICAL FIELD

This invention relates, in general, to using data pipes to transport data from one application to another application and, in particular, to transitioning from the use of a local data pipe to the use of a cross-system data pipe.

BACKGROUND OF THE INVENTION

Data piping between two units of work (e.g., a writer application and a reader application) includes the writer application writing data to a pipe and the reader application reading data from the pipe. The pipe is a conduit of a stream of data. As data is written to the pipe, the data is read from the pipe.

Within a single system (i.e., one operating system image), data piping is typically implemented using a FIFO buffer queue structure located in inboard memory. The pipe is accessible to both applications participating in the piping. Further, multiple writer and reader applications of the same system can access the same pipe.

Data piping can also be performed between applications on different systems using an external shared memory (i.e., cross-system data piping). This is described in co-pending, commonly assigned, U.S. patent application Ser. No. 08/846,718, now U.S. Pat. No. 6,092,166 filed Apr. 30, 1997, Bobak et al., entitled "Cross-System Data Piping Method Using An External Shared Memory," which is hereby incorporated herein by reference in its entirety. (The discussion of application Ser. No. 08/846,718 in this Background section is not an admission that application Ser. No. 08/846,718 is prior art.)

If an external shared memory is used for cross-system data piping in, for instance, a parallel systems processing complex (SYSPLEX) environment, there may be potential shortcomings if all of the piping applications, even those that are initiated and communicate with one another on the same system (i.e., local applications), use the external shared memory. For instance, the external shared memory could become overloaded, or the needless use of the external shared memory by local applications could cause the misappropriation of system resources.

In an effort to alleviate the above problems, users may try starting two piping subsystems on each system. One that handles the local applications, thereby enabling the use of local pipes; and another that handles the cross-system applications, thereby enabling the use of cross-system pipes. However, this can cause additional and/or different problems. For instance, additional resources are required to run the additional subsystem. Further, a great deal of complexity is added when two subsystems are used and need to be managed. Complexity is also added in the management of the jobs that use the subsystems. For example, if a user knows that he wants to use the local system, both applications would need to be guaranteed to execute on a single system that had the piping subsystem up and running.

Thus, a need still exists for a capability which allows the external shared memory to be used wisely for data piping, without requiring additional subsystems to be started and managed. In particular, a need exists for a capability that enables applications to be dynamically transitioned from using a local pipe to using a cross-system pipe, when such a need arises. A further need exists for a transitioning capability that uses system resources wisely and does not add complexity for the users.

SUMMARY OF THE INVENTION

The shortcomings of the prior art are overcome and additional advantages are provided through the provision of a data piping method. In one example, a first application of a first system accesses a data pipe that uses local media of the first system for the data pipe. When a second application on a second system is to access the data pipe, the data pipe is transitioned from a local pipe, in which the local media is used for the data pipe, to a cross-system pipe, in which an alternative non-local media is used for the data pipe.

In one example, the first application is transitioned from using the local pipe to using the cross-system pipe. When the first application is a reader, the transitioning includes, for instance, reading, by the reader, data from the local pipe until an empty state is obtained for the local pipe; and accessing, by the reader, the cross-system pipe when the empty state is obtained.

In another example, when the first application is a writer, the transitioning includes, for instance, determining that any readers associated with the local pipe have transitioned; reading from the local pipe to determine if data is within the local pipe; writing any data determined to be within the local pipe to the cross-system pipe; and accessing, by the writer, the cross-system pipe, when the local pipe is empty.

In another aspect of the present invention, a data piping system is provided. In one embodiment, the system includes a data pipe that uses local media of a first system for the data pipe. It further includes means for transitioning, when a second application on a second system is to access the data pipe, the data pipe from a local pipe, in which the local media is used for the data pipe, to a cross-system pipe, in which an alternative non-local media is used for the data pipe.

In yet another aspect of the present invention, an article of manufacture is provided. The article of manufacture includes at least one computer useable medium having computer readable program code means embodied therein for causing the piping of data. The computer readable program code means in the article of manufacture includes, for instance, computer readable program code means for causing a computer to effect accessing, by a first application of a first system, a data pipe that uses local media of the first system for the data pipe; and computer readable program code means for causing a computer to effect transitioning, when a second application on a second system is to access the data pipe, the data pipe from a local pipe, in which local media is used for the data pipe, to a cross-system pipe, in which an alternative non-local media is used for the data pipe.

The transitioning capability of the present invention advantageously enables the dynamic transitioning of a local pipe to a cross-system pipe. Further, it allows any applications connected to the local pipe to be transitioned from using the local pipe to using the cross-system pipe, when the cross-system pipe is to be used. The transitioning capability of the present invention does not require application changes and does not require the start up and management of additional subsystems (e.g., piping subsystems). It does allow, however, an alternative non-local media to be used wisely and it enables the appropriate use of resources. It does not add complexity for the users, since the users need not care nor manage on which systems their applications execute. The transitioning capability of the present invention also allows the dynamic transitioning from a cross-system pipe to a local pipe, when an application disconnects from the cross-system pipe and all remaining connections to the pipe are on a single system.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a capability is provided which enables applications to be dynamically transitioned from using a local data pipe to using a cross-system data pipe. The data pipe is the same named pipe, but instead of using local media to pipe the data, an alternative non-local media is used.

As one example, when an application first allocates a connection to a pipe it is considered a local pipe. Additional allocations to the pipe may occur. If the allocations are on the same system as the pipe, then the pipe remains local. However, once an application on a different system allocates a connection to the pipe, the pipe is transitioned from a local pipe to a cross-system pipe. That is, the alternative media is used to pipe the data. Any of the local applications still allocated to the pipe are also transitioned, in accordance with the principles of the present invention, such that they now access the cross-system pipe, instead of the local pipe.

An additional capability is provided which allows the dynamic transitioning from a cross-system pipe to a local pipe, when an application disconnects from the cross-system pipe and all remaining connections to the pipe are on a single system.

Figure 1A:
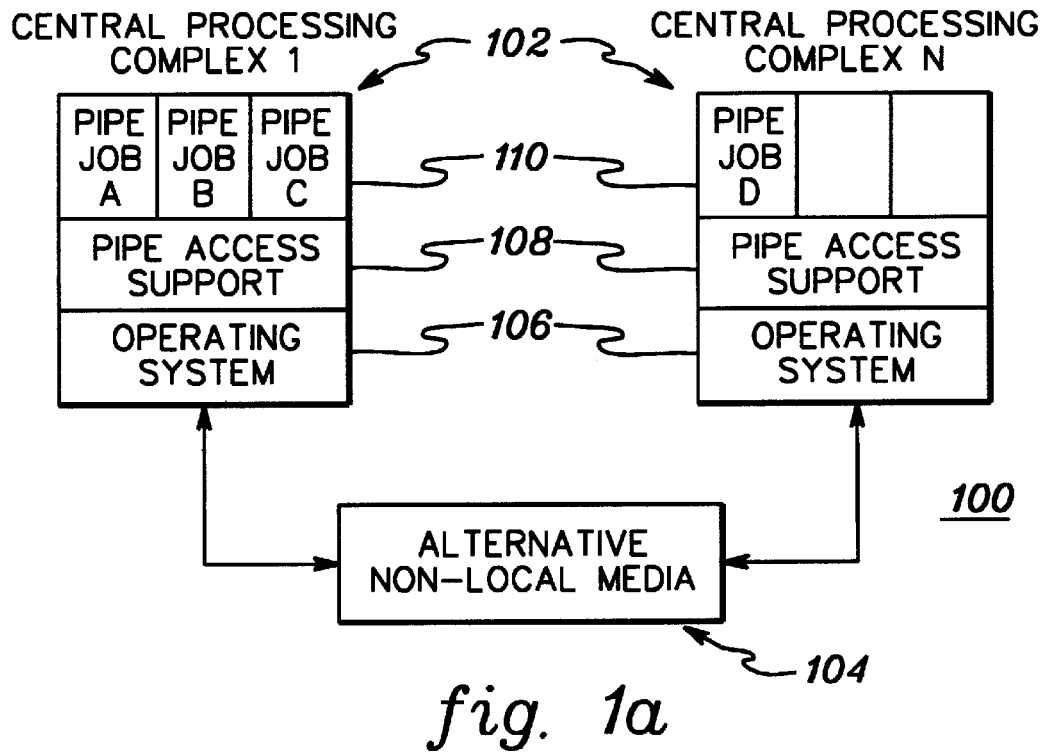
FIG. 1a depicts one example of a computing environment incorporating and using the transitioning capability of the present invention.

One embodiment of a computing environment incorporating and using the transitioning capability of the present invention is depicted in FIG. 1a and described in detail herein. In one example, a systems processing complex (SYSPLEX) 100 includes one or more central processing complexes 102 (also referred to as processors or central electronic complexes) coupled to at least one alternative non-local media 104.

In one example, each central processing complex 102 is designed following the Enterprise Systems Architecture (ESA)/390 offered by International Business Machines Corporation. Enterprise Systems Architecture/390 is described in detail in, for instance, "Enterprise Systems Architecture/390 Principles of Operation," Publication Number SA22-7201-02, Third Edition (February 1995), which is offered by International Business Machines Corporation, and is hereby incorporated herein by reference in its entirety.

Figure 1B:
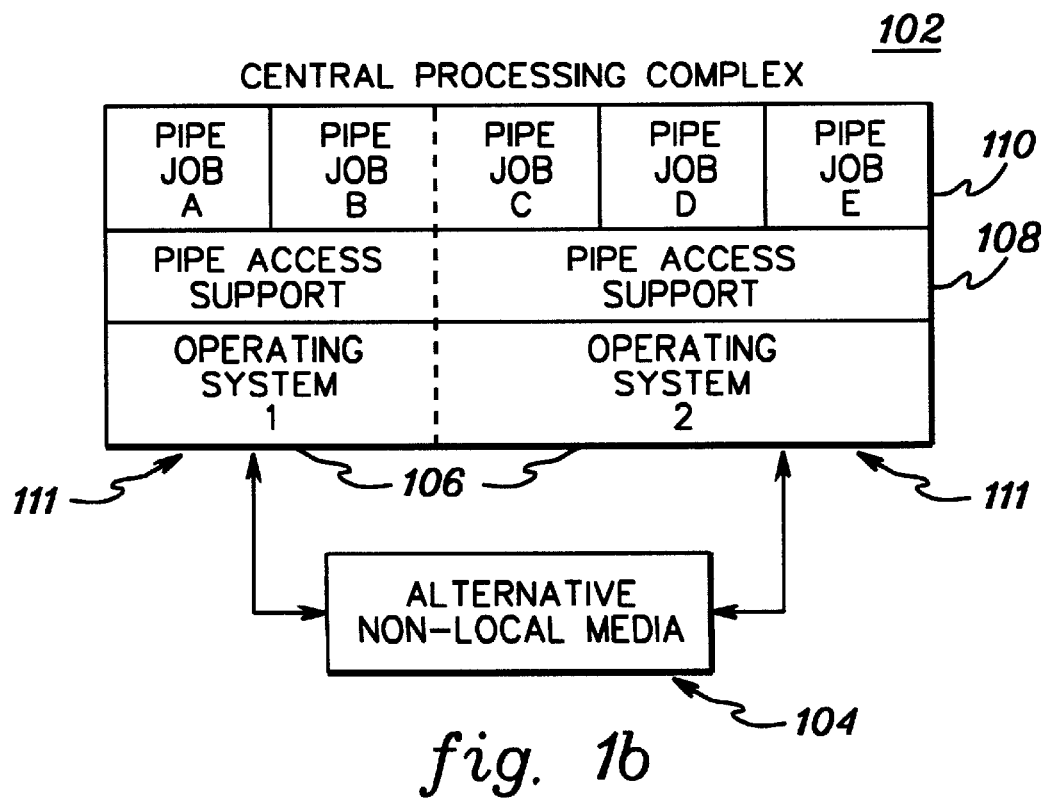
FIG. 1b depicts one example of a single central processing complex, including a plurality of operating systems, which can incorporate and use the transitioning capability of the present invention.

In one example, each central processing complex includes an operating system image 106, a pipe access support 108 and at least one piping application 110, each of which is described below. In another example, a central processing complex 102 includes a plurality of systems 111 (FIG. 1b), and each system 111 includes an operating system image 106, a pipe access support 108 and at least one piping application 110. Thus, in accordance with the principles of the present invention, a central processing complex includes one or more systems, each having its own operating system image and pipe access support.

One example of operating system 106 includes the OS/390 operating system offered by International Business Machines Corporation (or the Multiple Virtual Storage (MVS)/ESA operating system, offered by International Business Machines Corporation). Each central processing complex can include one or more images of OS/390, and/or one or more of various other operating system images (such as, for instance, the AIX operating system offered by International Business Machines Corporation) or any combination of the above. As is known, each operating system image controls the execution of applications running within the system associated therewith and the processing of data.

One or more subsystems, which provide pipe access support 108, can run under the control of an operating system image. One example of a subsystem running on OS/390 and using the transitioning capability of the present invention is IBM BatchPipes/MVS (hereinafter referred to as BatchPipes). Batchpipes is described in detail in "IBM SMARTBATCH For OS/390 Users' Guide and Reference," Publication Number GC28-1640-00, First Edition, March 1997, which is offered by International Business Machines Corporation, and is hereby incorporated herein by reference in its entirety.

Pipe access support 108 includes a data access technique used by piping applications 110 to access a pipe. In one example, the data access technique includes a sequential access method, such as QSAM or BSAM. The pipe access support includes, for instance, the processing logic used to access a local pipe (i.e., a local media manager), the processing logic used to access a cross-system pipe (i.e., a cross-system media manager), and the processing logic used in transitioning from a local pipe to a cross-system pipe, as described below.

Figure 2:
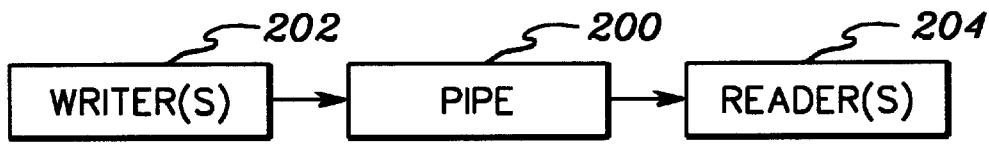
FIG. 2 depicts one embodiment of piping applications coupled to one another via a data pipe, in accordance with the principles of the present invention.

Piping applications 110 use a pipe, such as pipe 200 (FIG. 2), through standard access methods, as a medium to transport data from one application to another application. As shown in FIG. 2, in one example, one or more writers 202 (e.g., writer applications) write data to pipe 200 and one or more readers 204 (e.g., reader applications) read the data from the pipe. In one example, the pipe is a first in-first out queue. The data can be read from the pipe as soon as there is some data to be read. The reader does not have to wait until all the data to be written by the writer is within the pipe.

As mentioned above, pipe 200 may be considered a local pipe or a cross-system pipe. In accordance with the principles of the present invention, if all of the connections to the pipe are applications on the same system, then the data is piped through a local pipe located within local media of the system (e.g., local memory, a data space or any other media local to the system). On the other hand, if one or more of the connections to the pipe is an application on another system (either within the same Central Processing Complex or within a different Complex), then the data is piped through a cross-system pipe located within the alternative non-local media.

Referring back to FIG. 1a, in one example, alternative non-local media 104 is coupled to each of the Central Processing Complexes. (In another example, alternative non-local media 104 is coupled to one or more systems (see, e.g., FIG. 1b). The systems may be in the same Central Processing Complex or different Complexes.) In one embodiment, the alternative non-local media is an external shared memory (also referred to as a coupling facility). The external shared memory is, for instance, a structured-external storage (SES) processor, which includes a communications facility for communicating with the processors, a shared memory facility for storing shared data and for maintaining cross-system pipes, and a processing facility for managing the shared data and the cross-system pipes and for providing other functions. The external shared memory handles management tasks that were once handled by the individual systems or processors. It relieves the individual systems or processors of those tasks, such as the storage management tasks.

One example of an external shared memory is described in detail in U.S. Pat. No. 5,317,739, "Method and Apparatus for Coupling Data Processing Systems," Elko et al., issued on May 31, 1994 and assigned to International Business Machines Corporation, which is hereby incorporated herein by reference in its entirety.

Figure 3:
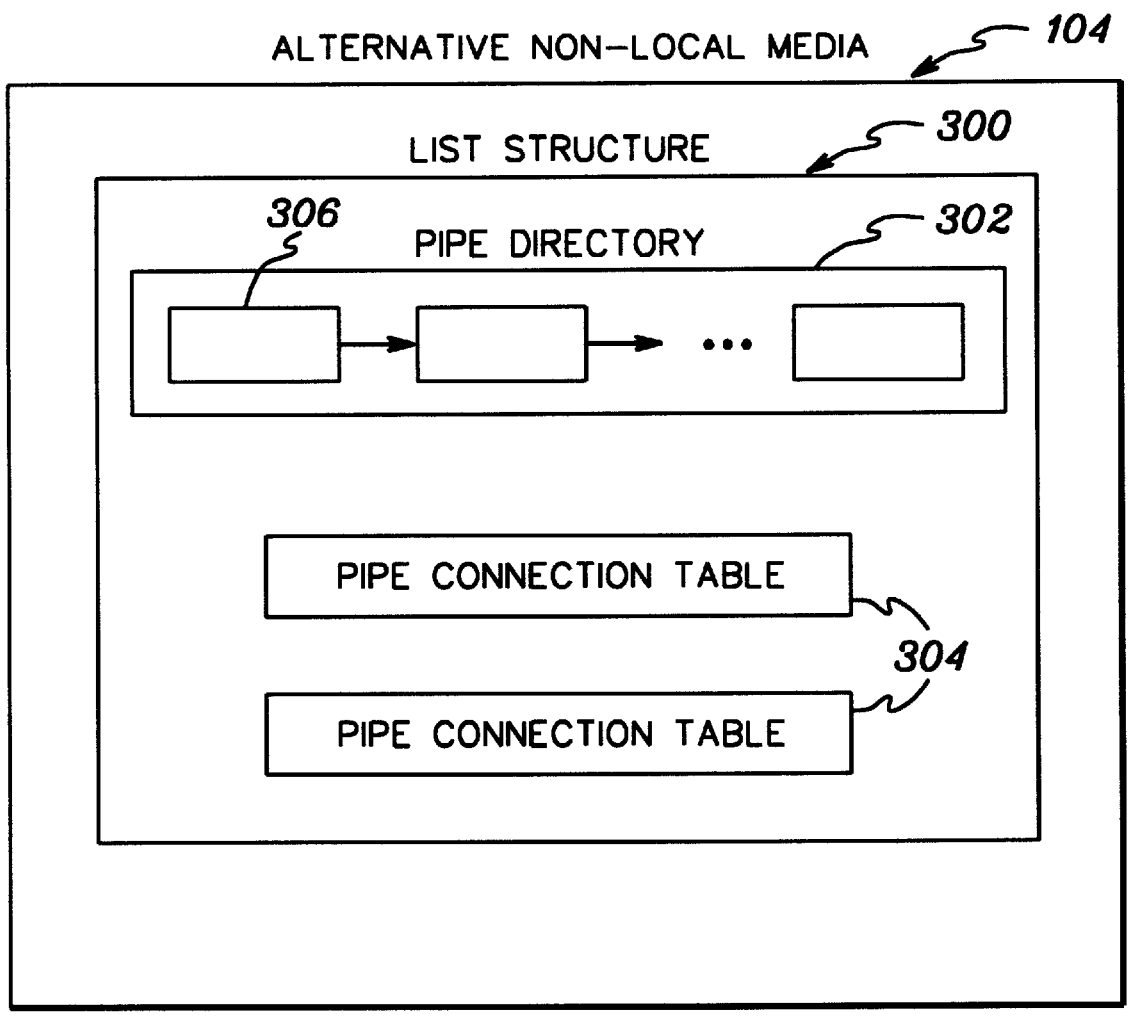
FIG. 3 depicts one example of a list structure located within an alternative non-local media, used in accordance with the principles of the present invention.

Alternative non-local media 104 includes, for instance, one or more list structures used during the transitioning capability of the present invention. In particular, a list structure holds information used to define one or more pipes and the connections to those pipes. One example of a list structure is depicted in FIG. 3 and described below.

In one embodiment, a list structure 300 includes a number of control structures, such as a pipe directory 302 and one or more pipe connection tables 304, each of which is described below. Pipe directory 302 includes an entry 306 for each allocated pipe (i.e., local and cross-system pipes). Each entry includes, for instance, the name and characteristics of the pipe being used and an indication of which systems are using the pipe. In one example, the name of the pipe includes the BatchPipes subsystem name plus a dataset name.

There is a pipe connection table associated with each allocated pipe. Each pipe connection table keeps track of which reader and writer pipe applications have connected to the pipe associated with that table. It also includes the system name of each allocated application.

The control structures described above are used during the transitioning capability of the present invention, as described below. Additional details associated with list structures are described in, for instance, U.S. Pat. No. 5,410,695 "Apparatus and Method for List Management In A Coupled Data Processing System," Frey et al., issued on Apr. 25, 1995 and assigned to International Business Machines Corporation, which is hereby incorporated herein by reference in its entirety.

Figure 4A:
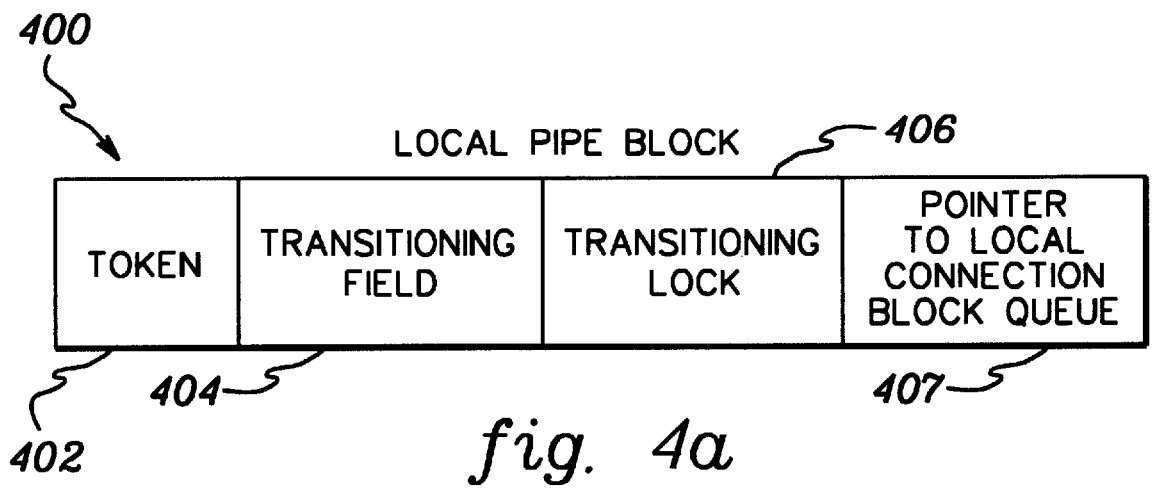
FIG. 4a depicts one example of a local pipe block located within the system of the local pipe, which is used in accordance with the principles of the present invention.

In addition to the control structures located within the list structure, there exists a local pipe block for each local pipe, which is located on the local system. For example, if System A includes Pipes A and B, then there would be a local pipe block for Pipe A and one for Pipe B. One embodiment of a local pipe block is depicted in FIG. 4a and described below.

A pipe block 400 includes, for instance, the following fields:

(a) A token 402 used to indicate whether the local media manager or the cross-system media manager is in control;

(b) A transitioning field 404 used to indicate whether the pipe is a local pipe, whether the pipe is transitioning or whether the pipe is a cross-system pipe. In one example, the transitioning field (e.g., a word) is set equal to 0, when all of the connections to the pipe are local connections. It is set equal to 1, when one of the connections is from a different system indicating that transitioning is to take place, and it is set to 2, when all of the connections have been transitioned. The transitioning field is set to 1 when an application from a different system allocates a connection to the pipe, which is reflected in pipe connection table 304. Further, the transitioning field is set to 2, when the last connection transitions.

In accordance with the principles of the present invention, pipe access support 108 is responsible for determining the different states and for appropriately setting the transitioning field.

(c) A transitioning lock 406 used in serializing transitioning of the pipe. In one example, the transitioning lock includes a pointer to a local connection block, described below, for an application connected to a local pipe, when it is transitioning and owns this lock; and (d) A pointer to local connection block queue 407 associating the local pipe block to a local connection block queue, which is described below. In another example, instead of a pointer, a token or any other means may be used to associate the pipe block and the local connection block queue.

The use of the token, transitioning field and transitioning lock is described in further detail below.

Figure 4B:
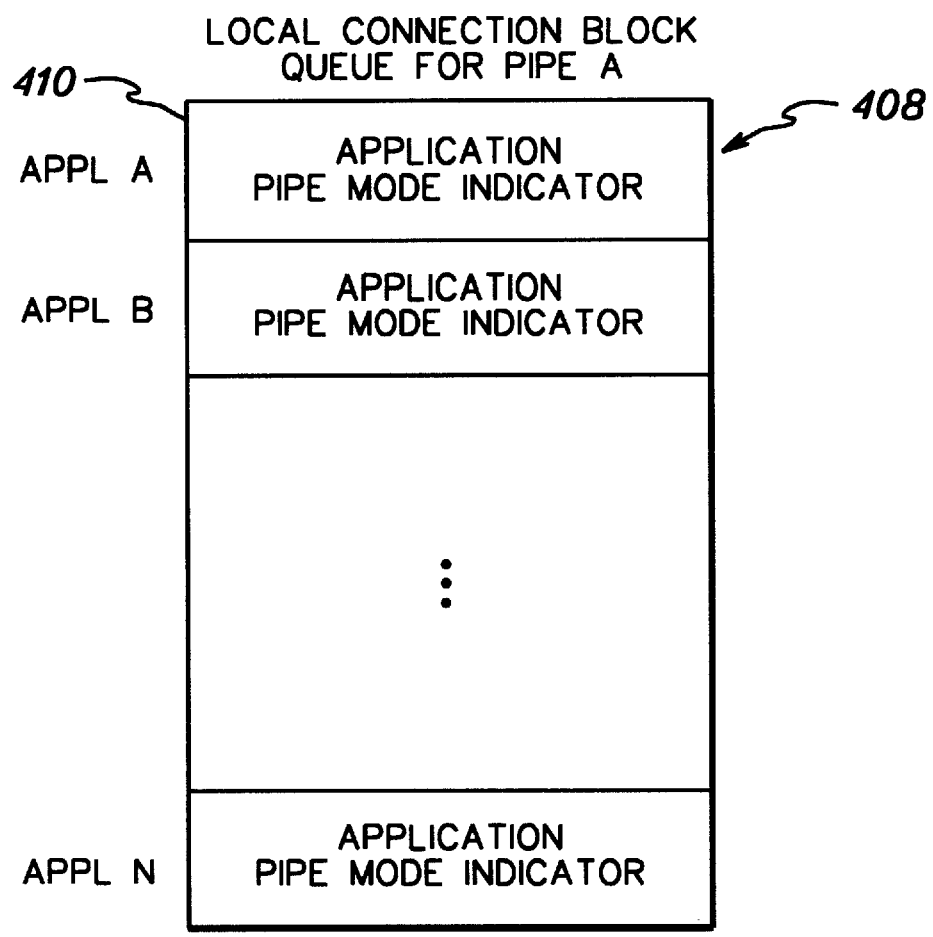
FIG. 4b depicts one example of a local connection block queue, which includes information for applications connected to a particular pipe, used in accordance with the principles of the present invention.

In addition to the above, for each pipe, there is a local connection block queue 408 (FIG. 4b), which includes one element 410 (i.e., a local connection block) for each application connected to the pipe. Each element 410 includes, for instance, an application pipe mode indicator, which indicates whether that application has transitioned from using a local pipe to a cross-system pipe. For example, the pipe mode indicator is a binary mode indicator that indicates whether the application is in local mode or cross-system mode. Again, the pipe access support is responsible for updating this indicator. (In another embodiment, there may be one queue for all of the pipes, in which each element pertains to a particular application and a particular pipe.)

As mentioned above, in accordance with the principles of the present invention, when all of the applications connected to a data pipe are initiated on the same system, a local pipe is used. However, when an application is initiated on a different system and that application allocates a connection to the pipe, the pipe becomes a cross-system pipe.

In particular, as each application allocates a connection to a pipe, the list of systems for that pipe, which is located in the pipe connection table, is updated and a check is made, via pipe access support 108 of the system performing the allocation, to determine if more than one system is named for the pipe. If so, then the pipe is considered a cross-system pipe. Thus, any applications previously connected to the local pipe are transitioned from using the local pipe to using the cross-system pipe, in accordance with the present invention. The application that caused the transitioning from the local pipe to the cross-system pipe and any other applications that thereafter allocate a connection to the pipe do not need to transition, since they start off accessing the cross-system pipe.

The processing logic associated with transitioning an application from the use of a local pipe to the use of a cross-system pipe is described in detail with reference to FIGS. 5–6. The logic is performed by, for instance, the pipe access support on the local system corresponding to the applications to be transitioned. The manner in which transitioning occurs depends on whether the application is a reader or a writer. One embodiment of the logic associated with transitioning a reader is described with reference to FIG. 5, and one embodiment of the logic associated with transitioning a writer is described with reference to FIG. 6.

Figure 5:
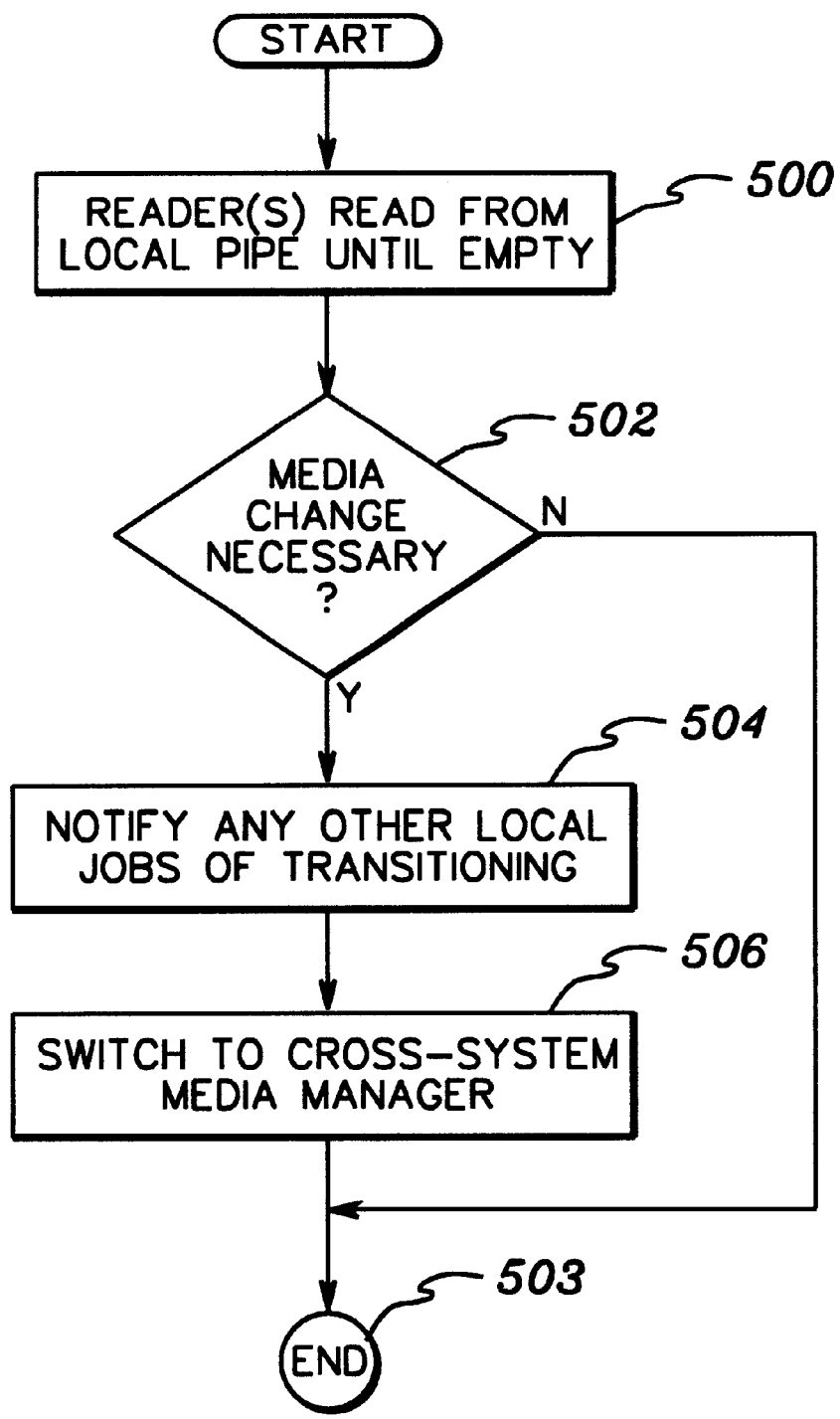
FIG. 5 depicts one embodiment of the logic associated with transitioning a reader from using a local pipe to using a cross-system pipe, in accordance with the principles of the present invention.
Figure 6:
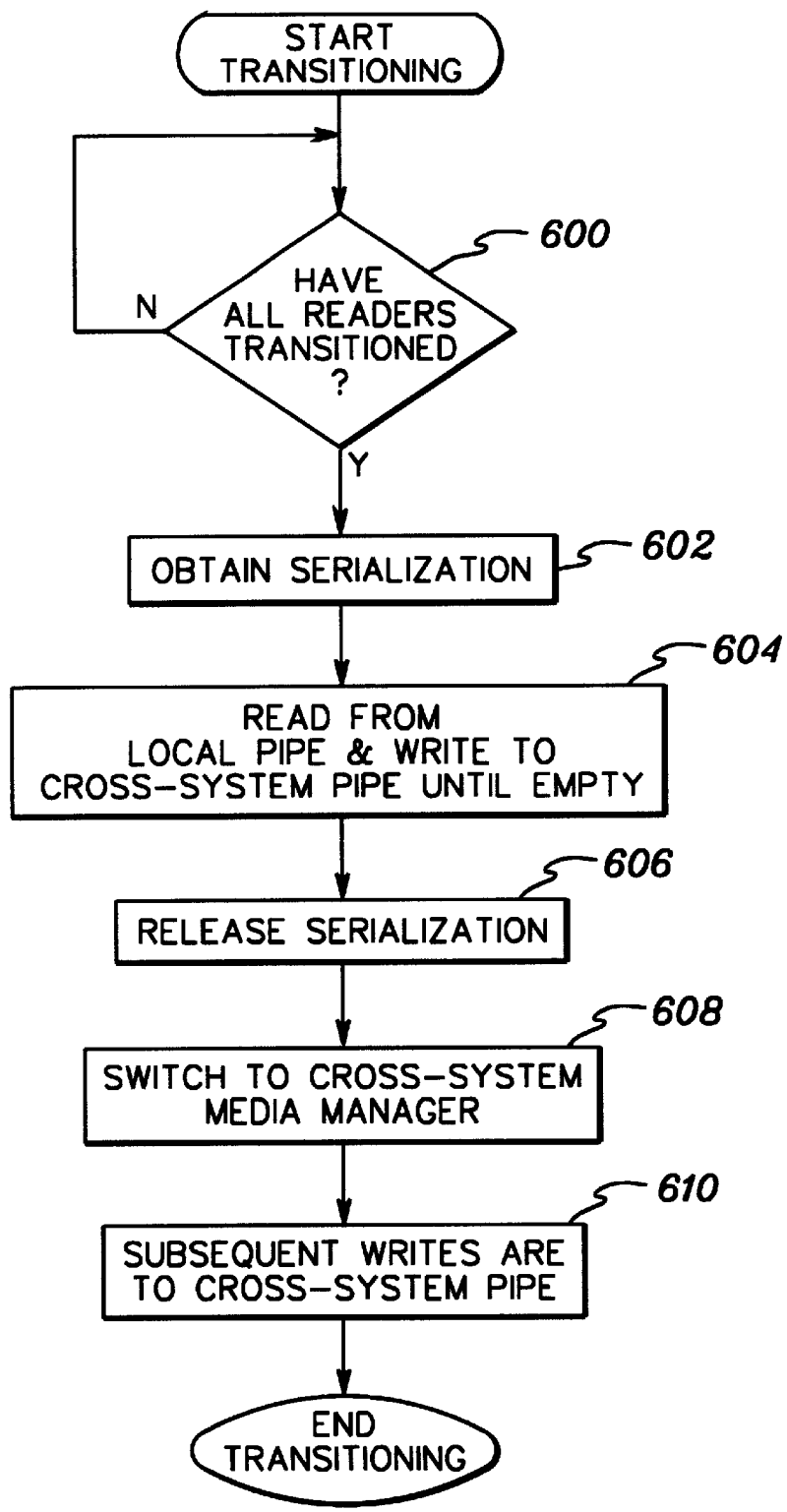
FIG. 6 depicts one embodiment of the logic associated with transitioning a writer from using a local pipe to using a cross-system pipe, in accordance with the principles of the present invention.

Referring to FIG. 5, any reader applications connected to the pipe continue to read from the local pipe until the local pipe is empty, STEP 500. That is, the reader(s) continue to perform, for instance, GET operations, until an empty state is reached in the local media (e.g., data space) corresponding to the pipe.

When the pipe access support determines that an application has reached an empty condition, the pipe access support makes a further determination as to whether a media change is necessary, INQUIRY 502. Specifically, the pipe access support checks transitioning field 404 (FIG. 4a), located within the local pipe block of the associated pipe, to see if there is an indication that the pipe has changed from local status to cross-system status.

If the field still reflects that all connections to the pipe are local (e.g., transitioning field 404 is set to 0), then no transitioning takes place, STEP 503. On the other hand, if the transitioning field indicates that an application on a different system has allocated a connection to the pipe (e.g., transitioning field 404 is set to 1), thus making it a cross-system pipe, then the transitioning process continues.

In one embodiment, if a media change is indicated, then the pipe access support on the local system notifies any other local applications of the transitioning via, for instance, a standard post/wait protocol, STEP 504.

Thereafter, a switch-over-takes place from the local media manager (i.e., the logic within the pipe access support providing access to the local pipe) to the cross-system media manager (i.e., the logic within the pipe access support providing access to the cross-system pipe), such that subsequent read operations are performed on the cross-system pipe through the cross-system media manager, STEP 506. The switch from the local media manager to the cross-system media manager includes, for example, switching token 402 of local pipe block 400. In particular, the token, which represented the local media manager is replaced with a token representative of the cross-system media manager. Thus, the pipe access support will use the logic and control blocks associated with the alternative non-local media for subsequent reads from the pipe. In addition, the application pipe mode indicator (FIG. 4b) is updated by the pipe access support to indicate a cross-system pipe is being used.

One example of how to read data from a cross-system data pipe is described in detail in co-pending, commonly assigned, U.S. patent application Ser. No. 08/846,718, filed Apr. 30, 1997, Bobak et al., entitled "Cross-System Data Piping Method Using An External Shared Memory," which is hereby incorporated herein by reference in its entirety.

In addition to transitioning any reader applications connected to the local pipe, any writer applications connected to the local pipe are also transitioned. Since it is important to preserve the ordering aspect of piping, in which data flowing through a pipe arrives at the reader application(s) in the order that it is written from a particular writer, each write to the local pipe results in a check to determine whether a media change is required. Again, this determination is made by checking transitioning field 404 (FIG. 4a) in the manner described above. If the field indicates that transitioning is required, then transitioning of any applications writing to the pipe occurs, as described with reference to FIG. 6.

Initially, a determination is made as to whether all of the reader applications of the local pipe have transitioned, INQUIRY 600. In particular, a post/wait mechanism is used in this inquiry. For example, when the pipe access support, on behalf of a reader application, detects an empty state on the local pipe, it transitions the reader to the cross-system pipe, it posts the one or more writer applications of the local pipe and places the reader in a wait state. When the one or more writers wakes up, the pipe access support checks to make sure that all of the readers have transitioned.

Specifically, the pipe access support of the writer(s) runs through local connection block queue 408 (FIG. 4b) and checks, for each of the reader applications of the queue, the application pipe mode indicator. If any of the reader application pipe mode indicators indicates that a reader is in local pipe mode, then the pipe access support determines that the transitioning of the readers is incomplete. Thus, the writer(s) (i.e., the pipe access support for the writer(s)) wait once again.

However, if all of the readers have transitioned, then serialization (i.e., exclusive access) of the pipe is obtained in order to ensure that only one connection is transitioning at a time, STEP 602. In one example, serialization is obtained by performing a compare and swap on transitioning lock 406 (FIG. 4a). (In another embodiment, an enqueue or any other technique may be used to obtain serialization.)

Subsequent to obtaining serialization, the pipe access support for the writer application(s) reads from the local pipe and if any data is found, it is written to the cross-system pipe, STEP 604 (i.e., the pipe access support temporarily transitions the writer to a reader). In particular, the pipe access support on behalf of the writer performs a GET operation on the local pipe, and if data is obtained, the pipe access support performs a cross-system PUT operation to write the data to the cross-system pipe. The read and write operations are performed iteratively until the local pipe is empty. One embodiment of a cross-system PUT operation is described in detail in co-pending, commonly assigned, U.S. patent application Ser. No. 08/846,718, filed Apr. 30, 1997, Bobak et al., entitled "Cross-System Data Piping Method Using An External Shared Memory," which is hereby incorporated herein by reference in its entirety.

When the pipe access support on the local system determines that an empty condition is met, serialization is released, STEP 606, and a switch is made to the cross-system media manager, as described above, STEP 608. Thereafter, subsequent writes are to the cross-system pipe located in the alternative non-local media, STEP 610. In addition, the application pipe mode indicator (FIG. 4b) of the transitioning application is updated to reflect cross-system mode.

As described above, a determination is made as to whether transitioning is necessary each time there is a write to the local pipe. Additionally, in one embodiment, this check is made after each successful write operation to ensure that data is not lost, since a connection can close a pipe at any point in processing. A final check is also made at pipe disconnect time. If the final check is not made, it is possible that data could be lost, if the last application connected to the pipe closed the pipe and data was still within the pipe. When transitioning is necessary, the above steps are followed.

Described in detail above is a dynamic transitioning capability in which a switch is made from a local pipe to a cross-system pipe, when and if an application on a different system than the local pipe allocates a connection to the pipe. Thus, if, for instance, BatchPipes is enabled in a SYSPLEX environment, data is only piped through the alternative non-local media, if applications from different systems are communicating. If applications from the same system are communicating, then the local pipe is used. The capability of the present invention advantageously allows the SYSPLEX enabled BatchPipes subsystem on a particular system to handle the transitioning, and does not require, for instance, the starting of another BatchPipes subsystem on that system (e.g., one that is not parallel SYSPLEX enabled). The capability of the present invention advantageously uses the BatchPipes' resources and systems' resources appropriately.

In addition to the above, transitioning from a cross-system pipe to a local pipe occurs, when an application disconnects from the cross-system pipe and the remaining connections to the pipe are local. This is accomplished in a similar manner to that described above with reference to FIGS. 5–6; however, the references to "local" would be changed to "cross-system" and the references to "cross-system" would be changed to "local". For instance, in STEP 500 (FIG. 5), instead of reader(s) reading from the local pipe until empty, reader(s) would read from the cross-system pipe until empty.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A data piping method, comprising:

accessing, by a first application of a first system, a data pipe that uses local media of said first system for said data pipe; and transitioning, when a second application on a second system is to access said data pipe, said data pipe from a local pipe in which local media is used for the data pipe to a cross-system pipe in which an alternative non-local media is used for the data pipe, wherein said data Pipe uses said alternative non-local media instead of said local media when said data pipe is transitioned to said cross-system pipe.

2. The data piping method of claim 1, wherein said transitioning comprises determining that said second system has a different identification from said first system prior to using said alternative non-local media for said data pipe.

3. The data piping method of claim 1, further comprising accessing, by said second application, said cross-system pipe.

4. The data piping method of claim 1, further comprising transitioning said first application from using said local pipe to using said cross-system pipe.

5. The data piping method of claim 4, wherein said first application is a reader, and said transitioning comprises:

reading, by said reader, data from said local pipe until an empty state is obtained for said local pipe; and accessing, by said reader, said cross-system pipe when said empty state is obtained.

6. The data piping method of claim 5, wherein said accessing by said reader comprises reading data from said alternative non-local media used for said cross-system pipe.

7. The data piping method of claim 5, further comprising switching from a local media manager to a cross-system media manager, wherein said cross-system media manager is used in accessing said cross-system pipe.

8. The data piping method of claim 7, wherein said switching comprises replacing a token representative of said local media manager with a token representative of said cross-system media manager.

9. The data piping method of claim 4, wherein said first application is a writer, and said transitioning comprises:

determining that any readers associated with said local pipe have transitioned;

reading from said local pipe to determine if any data is within said local pipe;

writing any data determined to be within said local pipe to said cross-system pipe; and accessing, by said writer, said cross-system pipe when said local pipe is empty.

10. The data piping method of claim 9, wherein said determining comprises checking an application pipe mode indicator for each reader of said local pipe to determine if said reader has transitioned.

11. The data piping method of claim 9, wherein said accessing by said writer comprises writing data to said alternative non-local media used for said cross-system pipe.

12. The data piping method of claim 9, further comprising switching from a local media manager to a cross-system media manager, wherein said cross-system media manager is used in accessing said cross-system pipe.

13. The data piping method of claim 1, further comprising storing control information for said local pipe and said cross-system pipe in said alternative non-local media.

14. A data piping method, comprising:

disconnecting a connection from a data pipe, said data pipe using an alternative non-local media, wherein any remaining connections to said data pipe are of a single system; and transitioning said data pipe from a cross-system pipe in which said alternative non-local media is used for the data pipe to a local pipe in which local media is used for the data pipe, wherein said data pipe uses said local media instead of said alternative non-local media when said data pipe is transitioned to said local pipe.

15. A data piping system, comprising:

a data pipe that uses local media of a first system for said data pipe; and means for transitioning, when a second application on a second system is to access said data pipe, said data pipe from a local pipe in which local media is used for the data pipe to a cross-system pipe in which an alternative non-local media is used for the data pipe, wherein said data ripe uses said alternative non-local media instead of said local media when said data pipe is transitioned to said cross-system pipe.

16. The data piping system of claim 15, wherein said means for transitioning comprises means for determining that said second system has a different identification from said first system prior to using said alternative non-local media for said data pipe.

17. The data piping system of claim 15, further comprising means for accessing, by said second application, said cross-system pipe.

18. The data piping system of claim 15, further comprising means for transitioning said first application from using said local pipe to using said cross-system pipe.

19. The data piping system of claim 18, wherein said first application is a reader, and said means for transitioning comprises:
means for reading, by said reader, data from said local pipe until an empty state is obtained for said local pipe; and
means for accessing, by said reader, said cross-system pipe when said empty state is obtained.

20. The data piping system of claim 19, wherein said means for accessing by said reader comprises means for reading data from said alternative non-local media used for said cross-system pipe.

21. The data piping system of claim 19, further comprising means for switching from a local media manager to a cross-system media manager, wherein said cross-system media manager is used in accessing said cross-system pipe.

22. The data piping system of claim 21, wherein said means for switching comprises means for replacing a token representative of said local media manager with a token representative of said cross-system media manager.

23. The data piping system of claim 18, wherein said first application is a writer, and said means for transitioning comprises:
means for determining that any readers associated with said local pipe have transitioned;
means for reading from said local pipe to determine if any data is within said local pipe;
means for writing any data determined to be within said local pipe to said cross-system pipe; and
means for accessing, by said writer, said cross-system pipe when said local pipe is empty.

24. The data piping system of claim 23, wherein said means for determining comprises means for checking an application pipe mode indicator for each reader of said local pipe to determine if said reader has transitioned.

25. The data piping system of claim 23, wherein said means for accessing by said writer comprises means for writing data to said alternative non-local media used for said cross-system pipe.

26. An article of manufacture comprising:
at least one computer useable medium having computer readable program code means embodied therein for causing the piping of data, the computer readable program code means in said article of manufacture comprising:
computer readable program code means for causing a computer to effect accessing, by a first application of a first system, a data pipe that uses local media of said first system for said data pipe; and
computer readable program code means for causing a computer to effect transitioning, when a second application on a second system is to access said data pipe, said data pipe from a local pipe in which local media is used for the data pipe to a cross-system pipe in which an alternative non-local media is used for the data pipe, wherein said data pipe uses said alternative non-local media instead of said local media when said data pipe is transitioned to said cross-system pipe.

27. The article of manufacture of claim 26, wherein said computer readable program code means for causing a computer to effect transitioning comprises computer readable program code means for causing a computer to effect determining that said second system has a different identification from said first system prior to using said alternative non-local media for said data pipe.

28. The article of manufacture of claim 26, further comprising computer readable program code means for causing a computer to effect accessing, by said second application, said cross-system pipe.

29. The article of manufacture of claim 26, further comprising computer readable program code means for causing a computer to effect transitioning said first application from using said local pipe to using said cross-system pipe.

30. The article of manufacture of claim 29, wherein said first application is a reader, and said computer readable program code means for causing a computer to effect transitioning comprises:
computer readable program code means for causing a computer to effect reading, by said reader, data from said local pipe until an empty state is obtained for said local pipe; and
computer readable program code means for causing a computer to effect accessing, by said reader, said cross-system pipe when said empty state is obtained.

31. The article of manufacture of claim 30, wherein said computer readable program code means for causing a computer to effect accessing by said reader comprises computer readable program code means for causing a computer to effect reading data from said alternative non-local media used for said cross-system pipe.

32. The article of manufacture of claim 30, further comprising computer readable program code means for causing a computer to effect switching from a local media manager to a cross-system media manager, wherein said cross-system media manager is used in accessing said cross-system pipe.

33. The article of manufacture of claim 32, wherein said computer readable program code means for causing a computer to effect switching comprises computer readable program code means for causing a computer to effect replacing a token representative of said local media manager with a token representative of said cross-system media manager.

34. The article of manufacture of claim 29, wherein said first application is a writer, and said computer readable program code means for causing a computer to effect transitioning comprises:
computer readable program code means for causing a computer to effect determining that any readers associated with said local pipe have transitioned;
computer readable program code means for causing a computer to effect reading from said local pipe to determine if any data is within said local pipe;
computer readable program code means for causing a computer to effect writing any data determined to be within said local pipe to said cross-system pipe; and computer readable program code means for causing a computer to effect accessing, by said writer, said cross-system pipe when said local pipe is empty.

35. The article of manufacture of claim 34, wherein said computer readable program code means for causing a computer to effect determining comprises computer readable program code means for causing a computer to effect checking an application pipe mode indicator for each reader of-said local pipe to determine if said reader has transitioned.

36. The article of manufacture of claim 34, wherein said computer readable program code means for causing a computer to effect accessing by said writer comprises computer readable program code means for causing a computer to effect writing data to said alternative non-local media used for said cross-system pipe.

37. A data piping system, comprising:
  means for disconnecting a connection from a data pipe, said data pipe using an alternative non-local media, wherein any remaining connections to said data pipe are of a single system; and
  means for transitioning said data pipe from a cross-system pipe in which said alternative non-local media is used for the data pipe to a local pipe in which local media is used for the data pipe, wherein said data pipe uses said local media instead of said alternative non-local media when said data pipe is transitioned to said local pipe.

38. An article of manufacture, comprising:
  at least one computer usable medium having computer readable program code means embodied therein for causing the piping of data, the computer readable program code means in said article of manufacture comprising:
    computer readable program code means for causing a computer to disconnect a connection from a data pipe, said data pipe using an alternative non-local media, wherein any remaining connections to said data pipe are of a single system; and
    computer readable program code means for causing a computer to transition said data pipe from a cross-system pipe in which said alternative non-local media is used for the data pipe to a local pipe in which local media is used for the data pipe, wherein said data pipe uses said local media instead of said alternative non-local media when said data pipe is transitioned to said local pipe.

* * * * *